Sept. 16, 1969     H. H. COYLE ET AL     3,467,403
KEYLESS CHUCK

Filed April 20, 1966     2 Sheets-Sheet 1

INVENTORS
HARRY H. COYLE
JOHAN L. MICHELSEN
BY
ATTORNEY

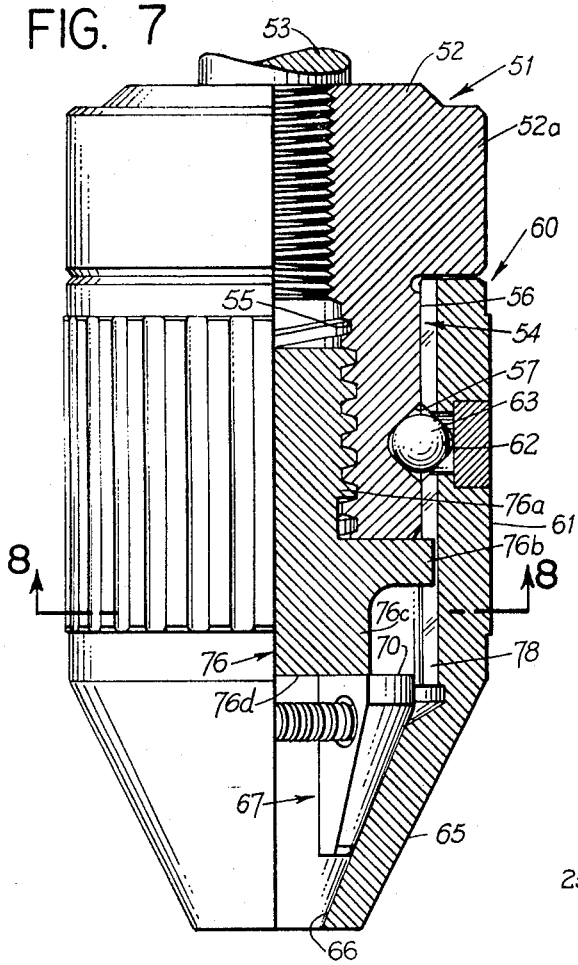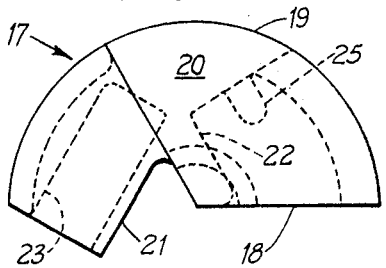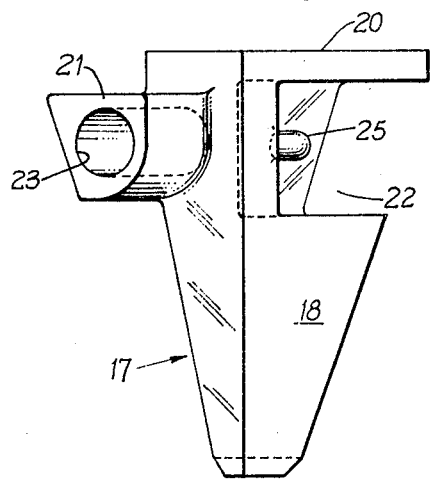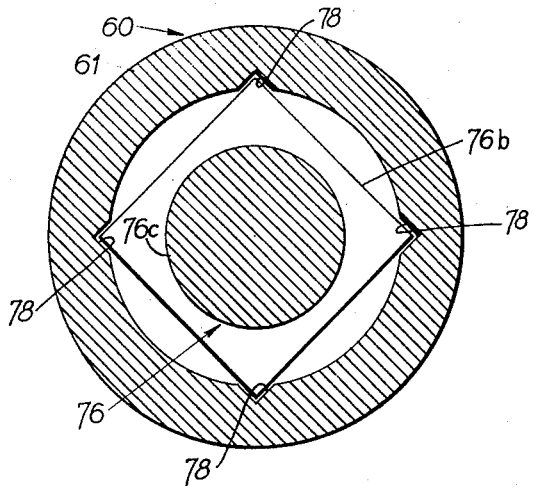

United States Patent Office 3,467,403
Patented Sept. 16, 1969

3,467,403
KEYLESS CHUCK
Harry H. Coyle and Johan L. Michelsen, Brooklyn, N.Y., assignors, by mesne assignments, to R. J. Okon Company, Inc., Chicago, Ill., a corporation of Delaware
Filed Apr. 20, 1966, Ser. No. 543,935
Int. Cl. B23b *31/12, 5/22;* B65g *3/02*
U.S. Cl. 279—58      9 Claims

ABSTRACT OF THE DISCLOSURE

The disclosure employs a chuck body which includes an interiorly threaded axially projecting tubular portion, and the shell includes a cylindrical portion which embraces the tubular portion of the body and is bearinged thereon, with the bearing means arranged to accept both radial and axial loads. The cylindrical portion of the shell projects beyond the end of the chuck body and then joins a nose portion which presents a frusto-conical inner surface embracing the assembly of jaw members, the latter having flat trailing end faces lying in a common plane which extends transversely of the chuck. Primary actuation of the jaw members is accomplished by a jackscrew means having exterior threads cooperating with the internal threads on the tubular portion of the chuck body. To transfer rotational movement from the shell to the jackscrew means, a groove and key arrangement is used, with the groove being so dimensioned that a material amount of movement of the shell is required before a driving engagement between the wall of the groove and the key is attained.

---

This invention relates to chucks for clamping tools and other objects and, more particularly, to keyless or self-energizing chucks.

Prior-art workers have proposed self-energizing chucks in various forms but there has been a continuing demand for improvement of such devices because of their relative complexity, high cost of manufacture, and the fact that the prior-art devices have frequently been difficult to operate for accomplishing release of the tool or other object.

It is accordingly a general object of this invention to devise a simpler, less expensive and more easily operated self-energizing chuck.

Another object is to provide such a chuck wherein clamping and release are accomplished by rotating a generally cylindrical shell, which also provides the frusto-conical surface with which the jaw members coact, and wherein an improved means is provided for transferring the rotary movement of the shell to the operating screw of the chuck.

A further object is to devise a self-energizing chuck operated by an outer shell bearinged on the body of the chuck for free rotation, with means for transferring rotary movement of the shell to the operating screw, such means constituting a lost motion connection which allows rotary movement of the shell to be commenced free of the resistance presented by the operating screw.

Yet another object is to devise such a chuck wherein rotation of the shell correspondingly rotates jackscrew means to apply an initial clamping force to the jaw members, the latter being so constructed and arranged that application of a torque to the tool or other object held by the chuck causes the jaw members to roll slightly with a camming action to provide a secondary clamping force, there being a lost motion connection between the shell and the jackscrew means to allow initial free turning of the shell, adequate to roll the jaw members and eliminate the secondary clamping force, before the jackscrew means is turned to release the chuck.

The invention employs a chuck body which includes an interiorly threaded axially projecting tubular portion, and the shell includes a cylindrical portion which embraces the tubular portion of the body and is bearinged thereon, with the bearing means arranged to accept both radial and axial loads. The cylindrical portion of the shell projects beyond the end of the chuck body and then joins a nose portion which presents a frusto-conical inner surface embracing the assembly of jaw members, the latter having flat trailing end faces lying in a common plane which extends transversely of the chuck. Primary actuation of the jaw members is accomplished by a jackscrew means having exterior threads cooperating with the internal threads on the tubular portion of the chuck body. To transfer rotational movement from the shell to the jackscrew means, a groove and key arrangement is used, with the groove being so dimensioned that a material amount of movement of the shell is required before a driving engagement between the wall of the groove and the key is attained. The jaw members have convex outer surfaces more sharply curved than is the frusto-conical surface of the shell. The outer surfaces of the jaw members are in line engagement with the frusto-conical surface of the shell, so as to be capable of both sliding lengthwise and rolling about a longitudinal axis. When the jaw members have been engaged with the tool or the like as a result of operation of the jackscrew means, a torque load applied to the tool or the like causes the jaw members to roll in camming fashion, applying an additional, secondary clamping force to the tool or the like. The lost motion connection afforded by the groove and key arrangement allows the shell to be turned freely through a small angular distance to cause the jaw members to roll in the opposite direction, thus eliminating the secondary clamping force before operation of the jackscrew means to release the chuck commences. In one embodiment, both the jackscrew member and the shell are provided with grooves, and a ring, provided with both an internal key and an external key, is disposed between the jackscrew and the shell. In other embodiments, the jackscrew means is in the form of one integral body which has a transverse flange presenting a key for cooperation with a groove in the shell.

In order that the manner in which the foregoing and other objects are achieved in accordance with the invention can be understood in detail, particularly advantageous embodiments thereof will be described with reference to the accompanying drawings, which form a part of this specification and wherein:

FIGURE 7 is a view, partly in side elevation and partly in longitudinal section, of a chuck in accordance with another embodiment of the invention;

FIGURE 8 is a transverse sectional view taken on line 8—8, FIGURE 7;

FIGURE 9 is an end elevational view of a jaw member employed in the chucks of FIGURES 1 and 7; and FIGURE 10 is a side elevational view of the jaw member.

Figure 1:
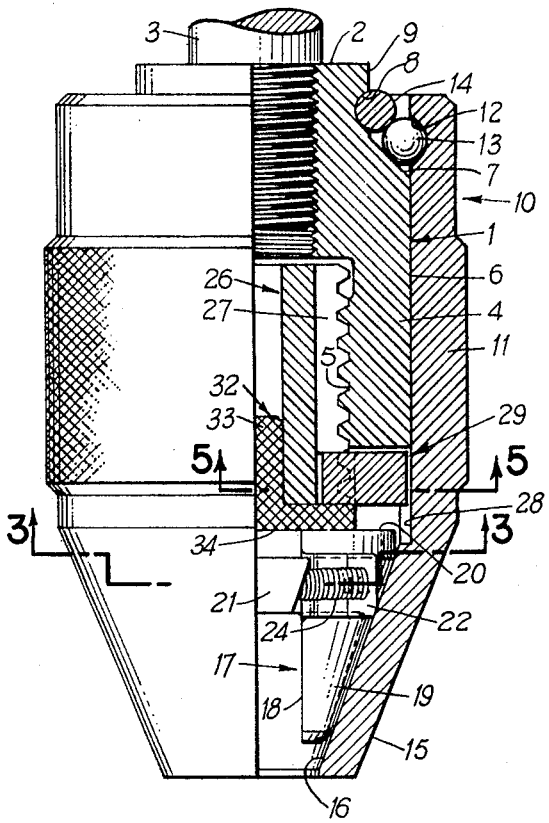
FIGURE 1 is a view, partly in side elevation and partly in longitudinal section as indicated by line 1—1, FIGURE 3, of a chuck constructed in accordance with one embodiment of the invention.
Figure 2:
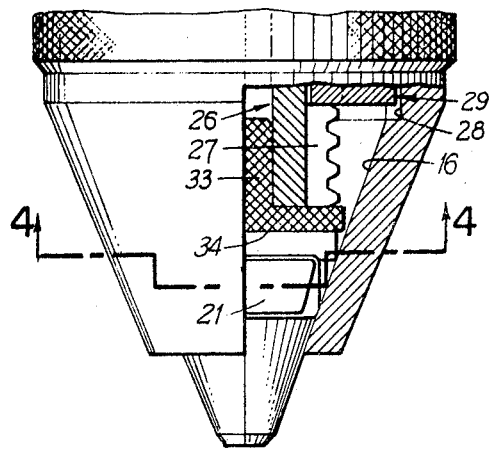
FIGURE 2 is a fragmentary view similar to FIGURE 1 but showing parts of the chuck in different relative positions.
Figure 4:
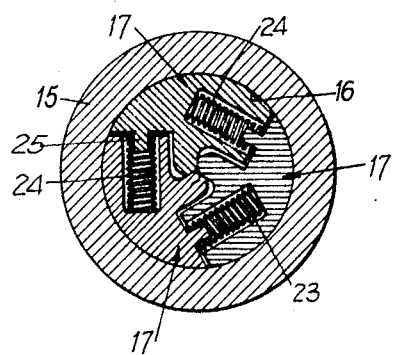
FIGURE 4 is a transverse sectional view taken on line 4—4, FIGURE 2.
Figure 3:
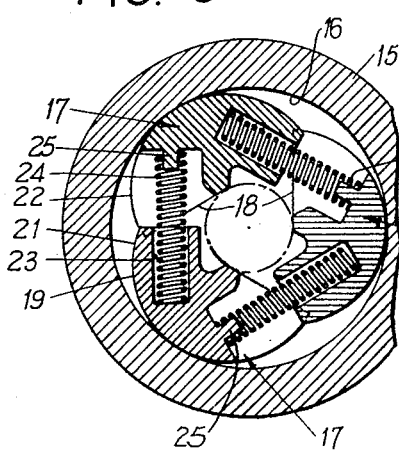
FIGURE 3 is a transverse sectional view taken on line 3—3, FIGURE 1.

Turning now to the drawings in detail, and first to FIGURES 1–5, the embodiment of the invention here illustrated comprises an integral chuck body member 1, end portion 2 of which is provided with an axial, threaded bore to accommodate the threaded tip of the driving spindle 3. Body member 1 also includes a tubular portion 4 which projects axially and presents a threaded internal surface 5 and a plain cylindrical outer surface 6. At end portion 2, outer surface 6 terminates in an inwardly tapering, transverse, frusto-conical shoulder 7, and an outwardly opening transverse annular groove 8 is provided in the short smaller diameter outer surface 9, groove 8 being immediately adjacent shoulder 7.

Shell 10 includes a cylindrical portion 11 having a length substantially greater than that of surface 6 of member 1. At one end, portion 11 is provided with an inwardly opening transverse annular groove 12 of semicircular transverse cross-section, and a plurality of spherical balls 13 are disposed in groove 12 and held therein, and in engagement with shoulder 7, by a snap ring 14 engaged in groove 8. At its opposite end, portion 11 is integrally joined to a tapered nose portion 15 presenting a frusto-conical inner surface 16 which tapers inwardly and away from body member 1.

An assembly of three jaw members 17, one of which is shown in detail in FIGURES 9 and 10, is embraced by surface 16. Each jaw member is an integral body having an inner clamping face 18, an outer face 19 which is part of a frusto-conical surface, and a flat transverse trailing end face 20. Near its trailing end face 20, each jaw member is provided with a lateral projection 21, extending away from one side of the member, and a recess 22 opening outwradly in the opposite direction and dimensioned and located to slidably or freely accommodate the projection 21 of the next adjacent jaw member. Projection 21 has a cylindrical bore 23 which accommodates a helical compression spring 24, FIGURES 1, 3 and 4. The inner wall of recess 22 is provided with a small boss 25 to be engaged within and locate the outer end of the spring 24 carried by the bore 23 of that projection 21 which the recess is to accommodate.

Figure 5:
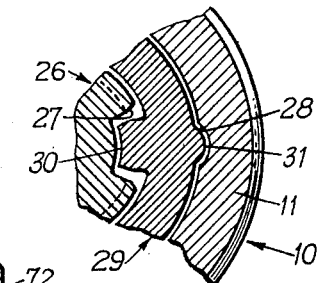
FIGURE 5 is a fragmentary transverse sectional view taken on line 5—5, FIGURE 1.

In this embodiment, the jackscrew means comprises a tubular exteriorly threaded screw member 26, the threads of which are engaged with the threads on the internal surface of tubular portion 4 of body member 1. The length of screw member 26 is substantially greater than that of tubular portion 4 of the body member, so that the screw member has a tip portion projecting beyond the tip of body portion 4 at all times. As best seen in FIGURE 5, screw member 26 is provided with an axially extending outwardly opening groove 27 running the length of the screw member. The groove 27 opens toward that portion of the inner surface of cylindrical portion 11 of the shell which projects beyond the tip of body portion 4. Here, the inner surface of shell portion 11 is provided with an axially extending inwardly opening groove 28. A rigid ring 29 is disposed between the projecting tip of screw member 26 and the cylindrical portion 11 of the shell, and has an inwardly projecting key 31 accommodated by groove 28. Groove 27 is of generally U-shaped transverse cross-section and substantially wider than key 30. Groove 28 and key 31 are of part-circle transverse cross-section, the radius of curvature of the cross-section of groove 28 being substantially greater than the radius of curvature of the cross-section of key 31. Hence, rotation of shell 10 can be imparted to screw member 26 only after the shell has been turned to engage key 31 with the wall of groove 28 and ring 29 has then been turned to engage key 30 with the wall groove 27.

The projecting end portion of screw member 26 carries a rigid actuating member 32 having a shank 33, fitted within the end of the tubular screw member, and a transverse, circular, flat portion 34 of such diameter as to engage the trailing end faces 20 of all of the jaw members.

In using the chuck, and assuming that shell 10 has been rotated to bring actuating member 32 to a substantially fully retracted position, shown in FIGURE 1, and that the jaw members 17 have also been moved to the fully retracted positions seen in FIGURE 1, the tool shank or other object to be clamped (not shown) is inserted endwise into the space defined by the clamping faces 18 of the jaw members. Shell 10 is then rotated in a direction to cause jackscrew member 26 to travel toward nose portion 15, so that, the flat face of member 32 being engaged with the trailing end faces 20 of all three jaw members, the jaw members are all simultaneously forced through nose portion 15 (downwardly as viewed in FIGURE 1), with the convex outer surfaces 19 of the jaw members sliding in line cnotact with frusto-conical surface 16. The outer surfaces 19 taper at the same angle as does surface 16. Accordingly, as surfaces 19 slide on surface 16, the jaw members, moving in union, are shifted inwardly until faces 18 engage the tool shank or other object. Rotation of shell 10 being continued until full metal-to-metal resistance is achieved, this action results in application of an initial or primary clamping force to the tool shank or other object. This action is accompanied by a reaction force which tends to separate shell 10 and body 1 in an axial direction, so that balls 13 accept an axial load. However, since balls 13 act as antifriction bearing elements, shell 10 is still essentially completely free for rotation within the limits afforded by the clearance between keys 30, 31 and grooves 27, 28, respectively.

As jaw members 17 close on the tool shank or other object, as a result of being forced through the nose portion 15, the effective diameter of the assembly of jaw members necessarily decreases, with the projection 21 of each jaw member entering the cooperating recess 22 of the next adjacent jaw member, and with springs 24 being correspondingly compressed. Since the three jaw members are identical and are spaced equally in a circular series, and since the clamping faces 18 are flat and so disposed as to be tangential with respect to the object being clamped, the movements of the jaw members as they reach positions in which the primary clamping force is applied are essentially rectilinear. However, when a torque is applied to the tool shank or other object being clamped, the jaw members are forced to rock in camming fashion about an axis parallel to the longitudinal axis of the chuck and immediately adjacent to the surface of the tool shank or other object. This rocking action has the effect of increasing slightly the radial dimension of each jaw member which must be accommodated between surface 16 and the tool shank or other object, so that an additional or secondary clamping force is applied. The secondary clamping force causes a reaction force which, because of the tapered nature of surface 16, acts in a direction tending to separate shell 10 and body 1, axially, increasing the axial loading of balls 13.

Before considering release of the chuck, it should be noted that, as to rotation of shell 10, there is only rolling engagement between the convex outer surfaces 19 of the jaw members and surface 16 of the shell, and only rolling engagement between the shell and balls 13, so that initial turning of the shell within the limits allowed by the clearance between keys 30, 31 and the respective grooves 27, 28 is resisted only by rolling frictional forces. Accordingly, shell 10 can be easily turned, in a direction to release the chuck, through the angular distance allowed by the key-and-groove clearances. Though this angular distance is small, it is adequate to cause the jaw members to rock in the opposite direction from that caused by the torque load on the tool shank or other clamped object. Hence, the secondary clamping force is removed as a result of the initial free turning of the shell, before keys 30, 31 are engaged respectively with the walls of grooves 27, 28 and thus before the resistance against turning presented by screw member 26 is encountered. With the secondary clamping force thus eliminated, the jackscrew member 26 is now actuated to remove the primary clamping force from the jaw members, this being accomplished by further rotation of shell 10. In effect, release of the chuck is thus accomplished in two stages, with the secondary clamping force being removed as a preliminary step so that, when the shell is turned further to rotate the jackscrew, the jackscrew is no longer loaded by the secondary clamping force and will therefore turn more fully.

Figure 6:
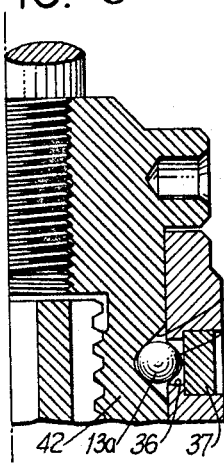
FIGURE 6 is a fragmentary longitudinal sectional view illustrating a portion of the chuck of FIGURE 1 in modified form.

In the modification illustrated in FIGURE 6, the location of the antifriction bearing means has been moved to the tubular portion 42 of the body member. That portion is provided with a transverse annular outwardly opening groove 72 which cooperates with a transverse annular inwardly opening groove 12a in the cylindrical portion of the shell. A radial port 36 communicates with groove 12a, so that the balls 13a can be introduced conveniently, the port being closed by a plug 37 after introduction of the balls. Both grooves 72 and 12a are of generally V-shaped transverse cross-section, and the balls 13a are in constant engagement with the diverging side walls of both grooves so that the resulting bearing means accepts axial loads as well as radial loads.

The embodiment of FIGURES 7 and 8 comprises a chuck body 51 having an end portion 52 provided with a threaded axial bore for connection to driving spindle 53. End portion 52 includes an outwardly projecting transverse annular flange portion presenting a transverse annular shoulder 52a. Tubular portion 54 projects coaxially with respect to end portion 52, in the same direction in which shoulder 52a faces, and has a threaded internal surface 55 and a plain cylindrical outer surface 56, the latter being interrupted by a transverse annular outwardly opening groove 57 in an area intermediate between the ends of tubular portion 54. Shell 60 includes a cylindrical portion 61, which embraces tubular portion 54 of the chuck body and is provided with a transverse annular inwardly opening groove 62 which opens toward groove 57. Grooves 57 and 62 accommodate a plurality of balls 63, the balls and grooves coacting to provide antifriction bearing means operative to accept both axial and radial loads. Shell 60 also includes a tapered nose portion 65 presenting a frusto-conical inner surface 66 tapering inwardly and away from the chuck body.

Cylindrical portion 61 of the shell is substantially longer than tubular portion 54 of the chuck body and therefore projects well beyond the tip of portion 54. The right cylindrical inner surface of shell portion 61 is interrupted by four grooves 78 which extend longitudinally of the shell and are spaced apart equally, as seen in FIGURE 8. Grooves 78 are straight, of right triangular transverse cross-section, and extend for the full length of that part of shell portion 61 which projects beyond the tip of portion 54.

In this embodiment, the jackscrew means comprises an integral member 76 having an exteriorly threaded shank 76a, the threads of which are engaged with the threads of internal surface 55 of body portion 54. At the root of shank 76a, member 76 has a transverse outwardly projecting flange 76b which is square as viewed endwise of the jackscrew member. Flange 76b thus presents four right angle corners, and the dimensions of the flange are such that each corner thereof can be disposed in a different one of the grooves 78, as shown in FIGURE 8, but with a substantial clearance between the corners and the walls of the respective grooves. Thus, the bottoms of grooves 78 lie on a circle, transverse to the chuck, the diameter of which is significantly greater than the length of a diagonal of the square formed by flange 76.

Member 76 also includes a nose portion 76c which projects axially beyond flange 76b and terminates in a flat transverse face 76d. Face 76d is sufficiently broad to engage the trailing end faces 70 of all of the three jaw members 67. Jaw members 67 are in all respects identical to jaw members 17, FIGURES 9 and 10, and cooperate with frusto-conical surface 66 as hereinbefore described.

Operation of the chuck shown in FIGURES 7 and 8 is essentially the same as described with reference to FIGURES 1–5.

We claim:
1. In a chuck, the combination of:
a body member adapted to be connected to a driving spindle and including a tubular portion having a cylindrical outer surface and a threaded inner surface concentric with said outer surface;
a shell including:
    a cylindrical portion embracing said outer surface of said body member; and
    a nose portion projecting axially from said cylindrical portion and presenting a frusto-conical inner surface which is coaxial with said body member and tapers inwardly and away therefrom;
a plurality of coacting jaw members each having an inner, clamping surface, an outer surface and a trailing end face, said jaw member being arranged within said frusto-conical surface of said nose portion of said shell with said outer surfaces in sliding engagement therewith and with said trailing end faces lying in a common plane which extends at right angles to the common longitudinal axis of said body member and said shell;
jackscrew means having
    exterior threads operatively engaged with the threads of said inner surface of said body member; and
    a flat transferse end face directed toward said trailing end faces of said jaw members;
    relative rotation between said jackscrew means and said body member in one direction serving to urge said end face of said jackscrew means against said trailing end faces of said jaw members to drive said jaw members forwardly in said nose portion;
anti-friction bearing means operatively engaged between said body member and said shell to accept both radial and axial loads, whereby said shell is free to rotate on said body member but is restrained against axial movement relative to said body member, said bearing means being spaced axially from said nose portion; and
means for imparting rotary movement of said shell to said jackscrew means comprising cooperating groove and radial key means so proportioned that the groove is substantially wider than the key, whereby, when the chuck is to be released, the shell can be rotated through a significant angle before the groove and key means are engaged to impart rotation to the jackscrew means.
2. A chuck according to claim 1, wherein:
a portion of said jackscrew means projecting beyond said tubular portion of said body member has an outer diameter substantially smaller than the inner diameter of the cylindrical portion of said shell;
said portion of said jackscrew means is provided with an outwardly opening axial groove, and said cylindrical portion of said shell is provided with an inwardly opening axial groove;
the chuck further comprising a ring member disposed between said portion of said jackscrew means and said cylindrical portion of said shell and including:
    an inner key projecting into said outwardly opening groove; and
    an outer key projecting into said inwardly opening groove.
3. A chuck according to claim 1, wherein:
said jackscrew means comprises an integral rigid body which presents said transverse end face and carries said exterior threads; and said cooperating groove and key means comprises an inwardly opening groove on said cylindrical portion of said shell, and an outwardly projecting key on said integral jackscrew body.

4. A chuck according to claim 3, wherein:

said integral jackscrew body is provided with a transverse outwardly projecting flange of square shape so as to present four right angle corners; and said cylindrical portion of said shell is provided with four equally spaced grooves each disposed to accommodate a different corner of said flange.

5. A chuck according to claim 4, wherein:

said four grooves are each of right triangular transverse cross-section;

the bottom of said grooves being spaced apart in a circle which is of significantly larger diameter than the circle defined by the corners of said flange.

6. A chuck according to claim 1, wherein:

said outer surfaces of said jaw members are convex and have a smaller radius of curvature than does said frusto-conical surface of said nose portion, said outer surfaces of said jaw members being in rolling contact with said frusto-conical surface of said nose portion; and said jaw members are so constructed and arranged that, when said jackscrew means has been operated to cause said jaw members to engage and clamp an object, a torque load applied in one direction to that object will cause said jaw members to roll in one direction on said frusto-conical surface of said nose portion in camming fashion to increase the clamping action of said jaw members on the object;

the freedom of rotation of said shell afforded by said groove and key means allowing said shell to be turned to cause said jaw members to roll in the opposite direction, and thus reduce the clamping force applied by said jaw members, as a preliminary to operation of said jackscrew means to release the jaw members by further turning of said shell.

7. In a chuck, the combination of a body member having a threaded surface;

a shell rotatably mounted on said body member and including a frusto-conical inner surface portion, the axis of rotation of said shell and the central axis of said frusto-conical surface being coincident;

a plurality of jaw members arranged in an annular series embraced by said frusto-conical surface;

each of said jaw members having an outer surface which is convex, extends in tapering fashion lengthwise of the chuck, and has a radius of curvature substantially smaller than the radius of curvature of said frusto-conical surface;

said jaw members being disposed with said outer surfaces each in substantially line contact with said frusto-conical surface so as to be capable of both sliding movement, lengthwise of the chuck, and rolling movement about an axis parallel to the central axis of said frusto-conical surface;

screw means having threads operatively engaged with the threads of said threaded surface of said body member, said screw means being operatively arranged to force said jaw members toward the small end of said frusto-conical surface when turned in one direction relative to said body member and to retract for release of said jaw members when turned in the other direction;

turning of said screw means in one direction, when an object to be clamped is disposed within said annular series of jaw members, causing said jaw members to slide lengthwise of the chuck along said frusto-conical surface and then to be shifted inwardly into engagement with the object, whereby the jaw members are caused to exert a primary clamping force on the object;

application of a torque load in one direction to the object so clamped causing said jaw members to roll on said frusto-conical surface in camming fashion, whereby the jaw members are caused to exert an additional, secondary clamping force on the object; and means constituting a lost motion connection between said shell and said screw means whereby rotation of said shell in either direction relative to said body member can be transferred to said screw means, said lost motion connection allowing a limited amount of free rotation of said shell, in a direction to release the chuck, to occur before rotation of said screw means commences, such limited amount of free rotation serving to impart to said jaw members, because of the frictional engagement between said outer surfaces of said jaw members with said frusto-conical surface, a slight rolling motion in a direction effective to eliminate said secondary clamping force, and adjacent ones of said jaw members are provided with cooperating laterally interengaged means effective to maintain said jaw members in alignment with each other transversely of the chuck.

8. A chuck according to claim 7, wherein said laterally interengaged means for each adjacent pair of jaw members comprises a lateral projection on one jaw member of the pair, and a laterally opening recess in the other jaw member of the pair, which recess accommodates said projection.

9. A chuck according to claim 9, wherein said lateral projection of each of said jaw members includes a bore which opens through the end of said projection, the chuck further comprising a plurality of compression springs each disposed in a different one of said bores and engaged with the adjacent wall of the one of said recesses which is presented by the next adjacent one of said jaw members.

References Cited

UNITED STATES PATENTS

| 893,348 | 7/1908 | Morrow | 279—60 |
| 2,220,654 | 11/1940 | Kirkland | 279—60 |
| 2,546,351 | 3/1951 | Stoner | 279—53 X |
| 2,880,008 | 3/1959 | Stoner | 279—58 |

FOREIGN PATENTS

| 688,429 | 3/1953 | Great Britain. |

ROBERT C. RIORDON, Primary Examiner